(12) United States Patent
Sinha et al.

(10) Patent No.: US 9,985,861 B2
(45) Date of Patent: May 29, 2018

(54) SGT FEATURE TRACE USING NETFLOW

(71) Applicant: Cisco Technology, Inc., San Jose, CA (US)

(72) Inventors: Alok Kumar Sinha, Bangalore (IN); Chetan Kumar S, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 14/512,567

(22) Filed: Oct. 13, 2014

(65) Prior Publication Data
US 2016/0105336 A1    Apr. 14, 2016

(51) Int. Cl.
*H04L 12/26*    (2006.01)

(52) U.S. Cl.
CPC .............. *H04L 43/10* (2013.01); *H04L 43/04* (2013.01)

(58) Field of Classification Search
CPC ................ H04L 43/10; H04L 43/04

USPC ........................................................ 709/224
See application file for complete search history.

(56) References Cited

U.S. PATENT DOCUMENTS

| 7,817,571 | B2 * | 10/2010 | Claise | H04L 63/101 370/252 |
| 9,088,496 | B2 * | 7/2015 | Vaidya | H04L 43/10 |
| 9,197,529 | B2 * | 11/2015 | Ganichev | H04L 45/586 |
| 9,369,368 | B2 * | 6/2016 | Khanal | H04L 43/12 |

* cited by examiner

*Primary Examiner* — Kevin Bates
*Assistant Examiner* — Nazia Naoreen
(74) *Attorney, Agent, or Firm* — Merchant & Gould P.C.

(57) ABSTRACT

Tracing of networking feature data may be provided for networking features running on network devices such as routers and switches. Examples of this feature tracing include "SGT tracing", "Access Control Entry ('ACE') tracing", and "Equal Cost Multipath ('ECMP') tracing." In ACE tracing, a network administrator may desire to trace all the ACEs of Access Control Lists ("ACLs") a particular packet is subject to. In ECMP, tracing information may be collected as to the ECMP links a particular packet is sent through at each of a plurality of network devices.

20 Claims, 4 Drawing Sheets

SGT FEATURE TRACE USING NETFLOW

TECHNICAL FIELD

The present disclosure relates generally to network troubleshooting, specifically through the usage of packet tracing.

BACKGROUND

Often during network troubleshooting a network administrator may desire to trace a packet matching to a specific requirement in the network and collect some useful feature information on the devices traversed by the packet. Typically, L2 and L3 traceroute utilities are used to trace a packet in network, but they suffer from certain usability issues.

For example, L2 and L3 traceroute utilities use packets with standard set of L2/L3/L4 parameters. However, the network administrator may be interested in tracing a specific packet with given set of L2/L3/L4/L7 parameters. The additional L7 data in packet could mean a different handling of specific packets. Hence there could be cases where a normal L2/L3 traceroute packet may pass through a given path, while the actual packet may get dropped on a device somewhere along the path due to policy configurations.

Another issue with prior traceroute utilities is that they may merely yield L2 and L3 layer parameters of the devices in the tracepath, This does not permit tracing Security Group Tags ("SGT") tags attached to a given packet as it traverses through a security policy management frame work such as a TrustSec-enabled network. In other words, obtaining networking feature level information from devices in this manner is not possible. To achieve this in prior systems, a network administrator would need to login to each of the discovered devices and obtain such information. Moreover, such information may not even be available, as it may be attached to a given packet.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Methods and system may be disclosed to provide tracing of networking feature data for any networking feature running on network devices such as routers and switches. This tracing approach may be referred to through this document as "feature tracing." Examples of feature tracing described herein include "SGT tracing", "Access Control Entry ('ACE') tracing", and "Equal Cost Multipath ('ECMP') tracing." In embodiments of ACE tracing, a network administrator may desire to trace the ACEs in the Access Control Lists ("ACLs") a particular packet is subject to. In embodiments of ECMP tracing information may be collected as to the ECMP links a particular packet is sent through at each of a plurality of network devices.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the present disclosure describe a solution for the tracing of any specific packet (not limited to traceroute packets, as in prior solutions) across a network and determine where the packet is dropped if need be. The specific packet will be designated a "Packet to Trace" or "PTC" throughout this document.

Embodiments of the present disclosure further describe a solution for collecting SGT tag information for the PTC on any number of network devices as the PTC traverses through them. SGT feature tracing may be extendible to any feature information desired by a network administrator. For example, the network administrator may desire to collect feature information for Security Group Access Control List ("SGACL") ACE features, ECMP Link features, and other feature information that can be gathered according to embodiments of the present disclosure. The term "feature tracing" as used herein may refer to any such feature information collection along a packet path.

Flow technology, such as Flexible NetFlow from CISCO Systems, Inc. may be employed to trace the path of a PTC. Such flow technology may contain an exporter mechanism capable of gleaning the feature trace information from the path of the PTC. Flexible NetFlow data in particular may enable users to view detailed, time-based and application-based usage of a network. This information allows planning and allocation of network and application resources including extensive near real-time network monitoring capabilities and can be used to display traffic patterns in application-based views. While embodiments herein may be described for devices supporting Flexible NetFlow, alternative embodiments are disclosed below for devices without such support.

In some embodiments of the present disclosure a PTC path may be first determined. The PTC path may contain a set of device identifiers corresponding to all devices through which the PTC will traverse going from a source to a destination within the network. Determining the PTC path may be achieved by using a simple L2 and L3 trace based on the L2 and L3 parameters of the PTC. It should be understood that such a trace may or may not be complete from the source device of the PTC to the destination IP address of the PTC. For example, interference with the device may cause a packet to be dropped due to configuration errors or other defects. The trace will halt at the time of the interference. In such a case, the feature trace may not provide all of the desired feature information, but may be limited to the data gleaned from the usual L2 and L3 trace.

When the L2 and L3 trace successfully completes, embodiments of the described feature trace may provide complete feature information for the entire PTC path. Feature tracing may then begin from a network device determined to be first device to be expected in the PTC path. In some embodiments, the network device may be an access device on an enterprise network to which the user is connected. However, it should be understood that any network device may be selected regardless of the device type or location. This determined first device may be referred to herein as a Trace Originating Device ("TOD").

Throughout the feature trace, each network device through which the PTC passes may report that it has detected the PTC. Such devices may be referred to herein as Trace Path Devices ("TPDs"). TPDs may encompass all network devices on the PTC path exclusive of the TOD. There are a number of mechanisms though which the TPDs may detect the PTC.

For example, if the TPD is an enterprise switch (2k/3k/4k/6k) a Flexible NetFlow monitor may be installed on the interface of the network device. In some embodiments, the monitor may maintain a record that provides a match on the source IP address and the destination IP address of the PTC. The monitor may further maintain a collect field to store collected feature information. When the PTC passes through the network device a cache may be created for it at the monitor. This cache may reside along with separate flow caches created for other traffic crossing the monitor interface.

In some embodiments, the network device may have an agent running on it. Such a network device agent may gather all of the flow caches created for the monitor. The network device agent may subsequently filter the flow caches to find the PTC flow cache. In alternate embodiments, where the network device does not have an agent running, each of the created flow caches (including the PTC flow cache and all other traffic flow caches) may be reported to the monitor. The monitor may then export the flow caches to the TOD. The TOD then will filter the flow caches to find the PTC flow cache.

Some embodiments of the present disclosure may then copy the ACL associated with the PTC on the network device interface as an alternative to Netflow. A COPY ACL for the PTC may be installed on the interface known from the L2/L3 trace. This COPY ACL may ensure that when the PTC passes through the interface, a copy of the ACL is punted to the CPU. This may be accomplished by catching the packet as it is punted to the CPU associated with the network device.

Once the PTC is captured, trace information (including feature information) for the PTC may be collected and sent using exporter methods defined in Flexible NetFlow or through encapsulating the packet in a NetFlow v9 packet and exporting the NetFlow v9 packet to the TOD. NetFlow v9 reports may comprise hexadecimal values representative of the gathered feature information. NetFlow v9 is defined in detail in "Cisco Systems NetFlow Services Export Version 9" which is located at http://www.ietf.org/rfc/rfc3954.txt and is incorporated herein in its entirety.

In some embodiments, the TPDs may provide any requested collected feature data back to the TOD once the TPD detects the PTC. Regardless of the way in which a given TPD detects the PTC, the feature trace information may be provided back in a uniform format between all PTCs. This may help to simplify any modules used to receive and parse feature trace info from a number of network devices on the PTC path. In certain embodiments, the uniform format may be the NetFlow v9 reporting format.

To implement embodiments of the described feature trace a PTC may be prepared based on the requirements of the particular feature search. Next, it may be determined what TPDs that the PTC will traverse. This may be accomplished by using the IP address for the source device for the PTC and the destination IP address to discover all L2 and L3 devices that the PTC will likely traverse. Then, the discovered TPDs may be prepared to detect the PTC and report back the requested feature trace information. Finally, a record collector may be started for listening for feature trace reports (such as Flexible NetFlow v9 reports) being transmitted from the TPDs.

The preceding steps may prepare the network for implementation of the feature trace. At this point, the PTC may be injected into the network. The PTC traverses from the source device through any number of the located TPDs between the PTC source and the PTC destination. As each TPD detects the PTC, the respective TPD may prepare a formatted report (such as a Flexible NetFlow v9 report) containing the desired feature trace identification. A record collector running on the TOD may gather each of the reports transmitted from the respective TPDs.

These TPD records may be processed and filtered to locate the desired information and present the information in a requested format. For example, the TOD may analyze whether or not the PTC was dropped by any of the TPDs. If filtering of the PTC occurred at the TPD, no cache would have been reported from that TPD. Alternatively, if the PTC was not filtered, a cache may be received at the TOD, but a PTC-specific cache will be missing. The cache corresponding to the PTC may contain a number of fields corresponding to each of the respectively requested feature information fields.

Figure 1:
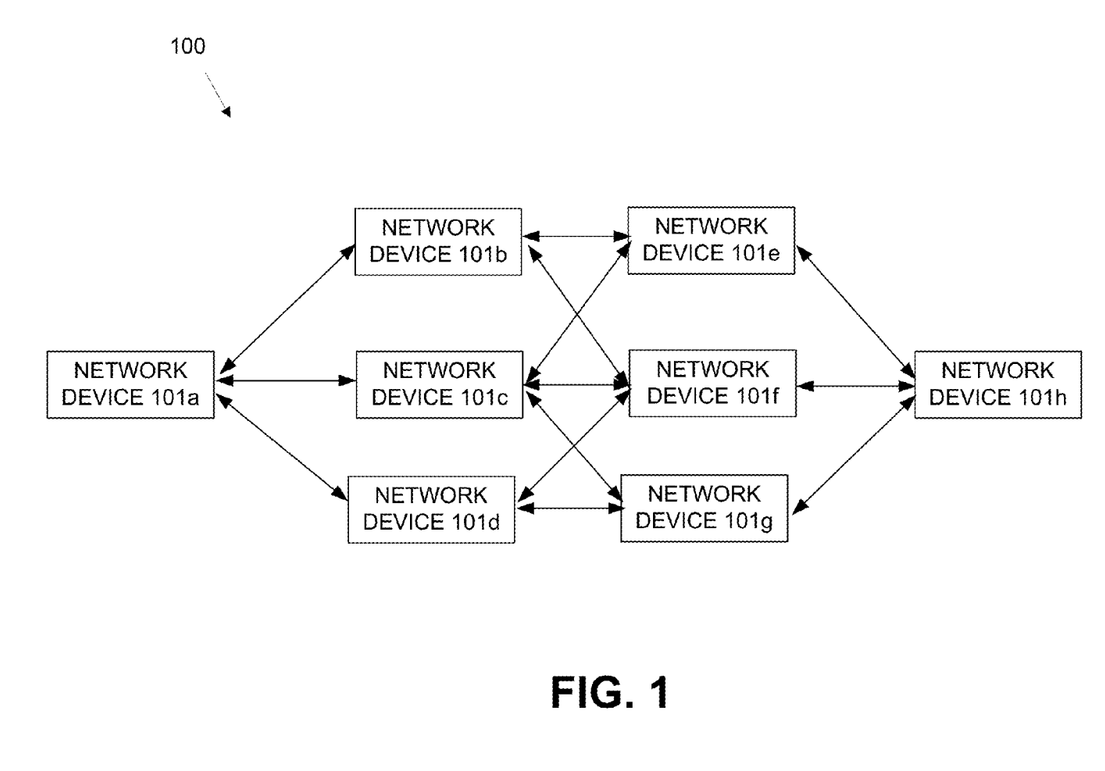
FIG. 1 illustrates a sample network topology where embodiments of the present disclosure may be performed.

FIG. 1 illustrates a sample network topology. The topography described in FIG. 1 will be used in the following description to illustrate embodiments of the present disclosure.

The described network topology may exist in a networking environment 100. While networking environment 100 is depicted as a wired network environment, a wireless network environment is also consistent with embodiments of the disclosure. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or wireless networks suitable for packet-type communications, such as Internet communications.

Networking environment 100 may comprise a number of network devices 101a-h. Network devices 101a-h may be routers, bridges, or other network devices capable of receiving and transmitting a data stream (including PTC packets)

from a source network device (here, 101*a*) to a destination network device (here, 101*h*). Network devices generally are discussed in further detail in regards to FIG. 2.

Networking environment 100 may be designed to transmit a stream of data packets from network device 101*a* to network device 101*h*. The data packets may be related to any number of network applications where various feature information may be gleaned, such as SGT tag information, SGACL") ACE features, ECMP Link features. As can be seen, there are numerous paths upon which packets can travel to traverse from network device 101*a* to network device 101*h*.

Figure 2:
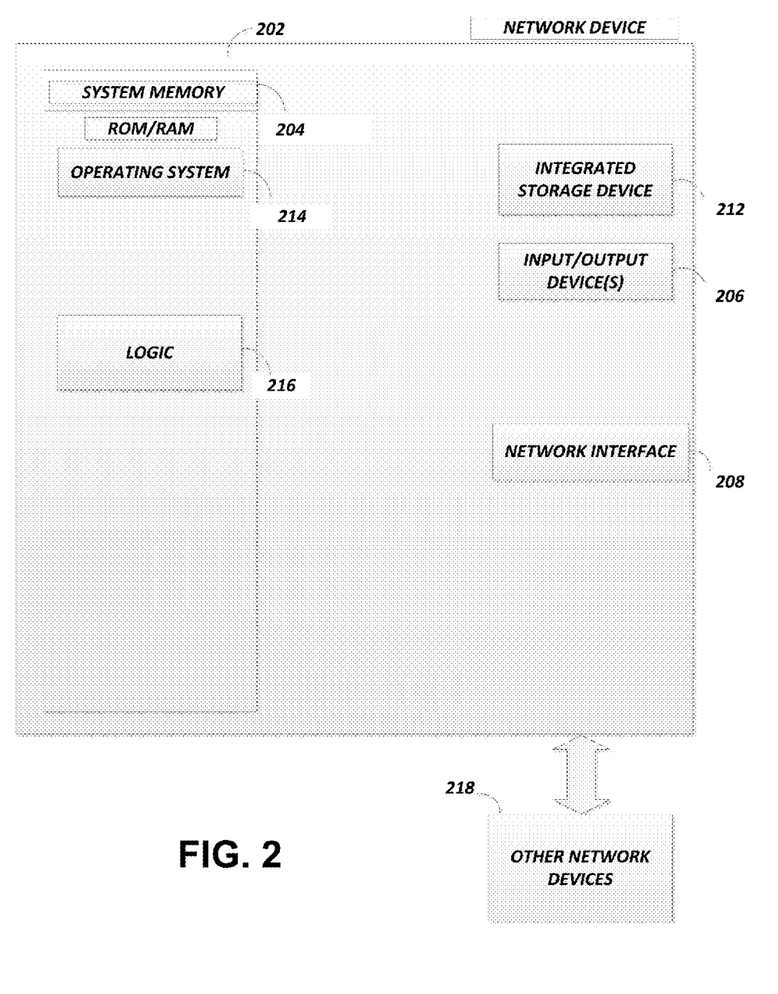
FIG. 2 shows a network device in greater detail.

FIG. 2 shows a network device (such as network devices 101*a-h*) in greater detail. A network device may include a processing device 202, a memory 204, input/output (I/O) devices 206, and a network interface 208, each of which is communicatively coupled via a local interface (not shown). Processing device 202 may be a hardware device for executing software, particularly that which is stored in memory 204. Processing device 202 may be any custom made or commercially available processor, a central processing unit (CPU), an auxiliary processor among several processors, a semiconductor-based microprocessor (in the form of a microchip or chip set), a microprocessor, or generally any device for executing software instructions.

Network interface 208 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 206 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 210 may include address, control, and/or data connections to enable appropriate communications among the aforementioned components and provides the interface to communicate with a network controller (not shown) or a TOD (such as network device 101*a*.

In some embodiments, a network device may further be configured with an integrated storage device 212 coupled to local interface 210. Storage device 212 may be configured to buffer a plurality of data packets. In some embodiments, storage device 212 may be externally coupled to a content server (not shown).

Memory 204 may include a suitable operating system (O/S) 214. Operating system 214 essentially may control the execution of other computer programs, such as scheduling, input-output control, file and data management, memory management, and communication control and related services. Logic 216 may include executable code to send service requests to the network controller or TOD.

Memory 204 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, semi-conductive, and/or other types of storage media. Note that memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 204 may include operating system 214 and logic 216, as explained above. Functionality of logic 216 may be implemented using a single module, or distributed among a plurality of modules.

When logic 216 is in operation, processing device 202 may be configured to execute logic 216 stored within memory 204, to communicate data to and from memory 204, and to generally control operations of logic 216. Logic 216 and O/S 214, in whole or in part, but typically the latter, are read by processing device 202, perhaps buffered within processing device 202, and then executed.

The network controller may include a communication interface suitable for enabling communication (e.g., TCP/IP) of data packets with other network devices 218 of network environment 100. For instance, communication interface may be of a type suitable for communication over an IP network, a coaxial cable network, an HFC network, and/or wireless network, among others.

Figure 3:
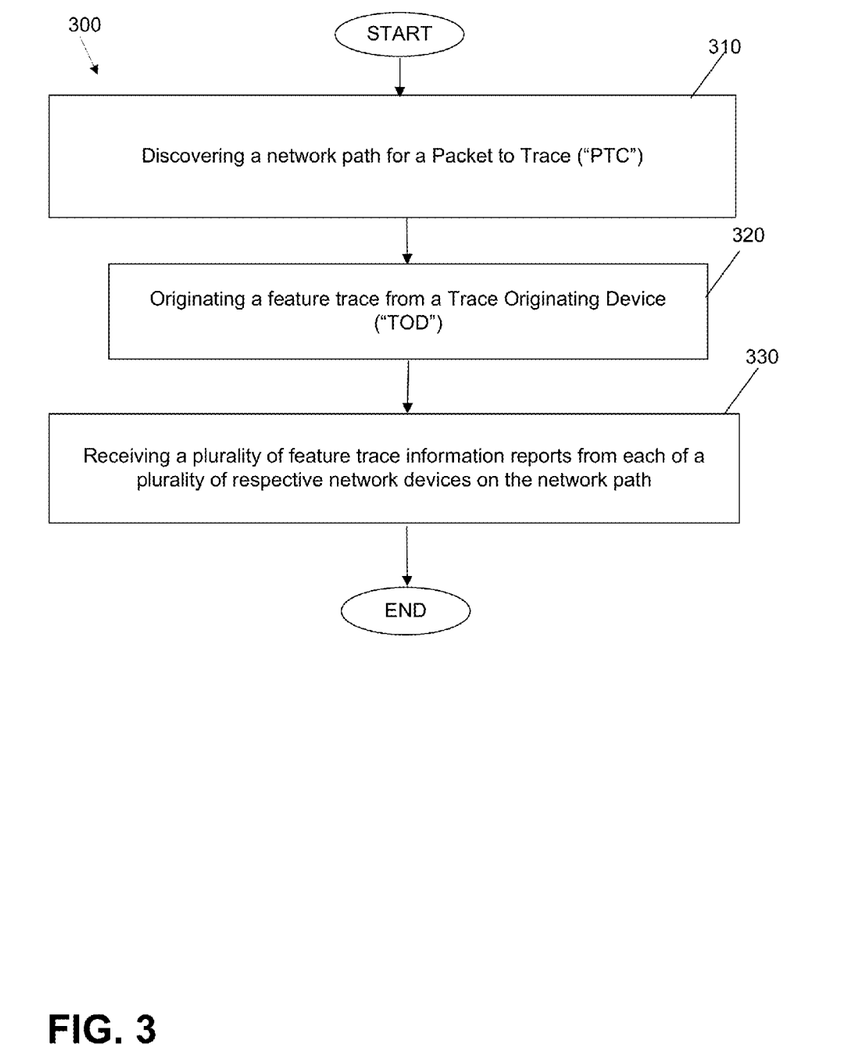
FIG. 3 is a flow chart illustrating embodiments of the present disclosure.

Having described various components of certain embodiments of network environment 100, a method 300 implemented by one or more network devices employed on network environment 100 will now be described with reference to FIG. 3.

Method 300 may begin at step 310 where a network path may be discovered for a Packet to Trace ("PTC"). In some embodiments, discovering the network path may further comprise using an L2 and L3 trace using the L2 and L3 parameters of the PTC.

Next, method 300 may proceed to step 320 where a feature trace may be originated from a Trace Originating Device ("TOD"). In some embodiments, initiating the feature trace further comprises starting the feature trace at a network device which is the first network device from the TOD on the network path. The first network device from the TOD on the network path may be an access device in an enterprise network through which a user first connects.

During the feature trace, each respective network device may detect the PTC through a monitor associated with each respective network device interface. In some embodiments, the monitor may be a Flexible NetFlow monitor capable of generating Flexible NetFlow v9 records comprising feature trace information. The Flexible NetFlow v9 records may comprise matches of a PTC source IP address and a PTC destination IP address. Furthermore, the Flexible NetFlow v9 records may comprise one or more collect fields for storing requesting feature trace information.

The information for the record may be stored through the creation of a NetFlow cache at each network device when the network device detects the PTC. In some embodiments, an agent may be employed to gather flow caches created for a given monitor. The agent may also filter the gathered flow caches to locate the relevant PTC flow cache. Information may also be gleaned by copying an Access Control List ("ACL") for the PTC on a network device interface and installing the copy ACL on the interface.

Then, method 300 may proceed to step 330 where a plurality of feature trace information reports may be received from each of a plurality of respective network devices on the network path, wherein each respective feature trace information report is created subsequent to each respective network device detecting the PTC. In some embodiments, the PTC packet may be captured after it is punted to a first CPU. Then feature trace information for the reports may be extracted from the captured PTC packet. The reports may be transmitted to the TOD for processing.

Figure 4:
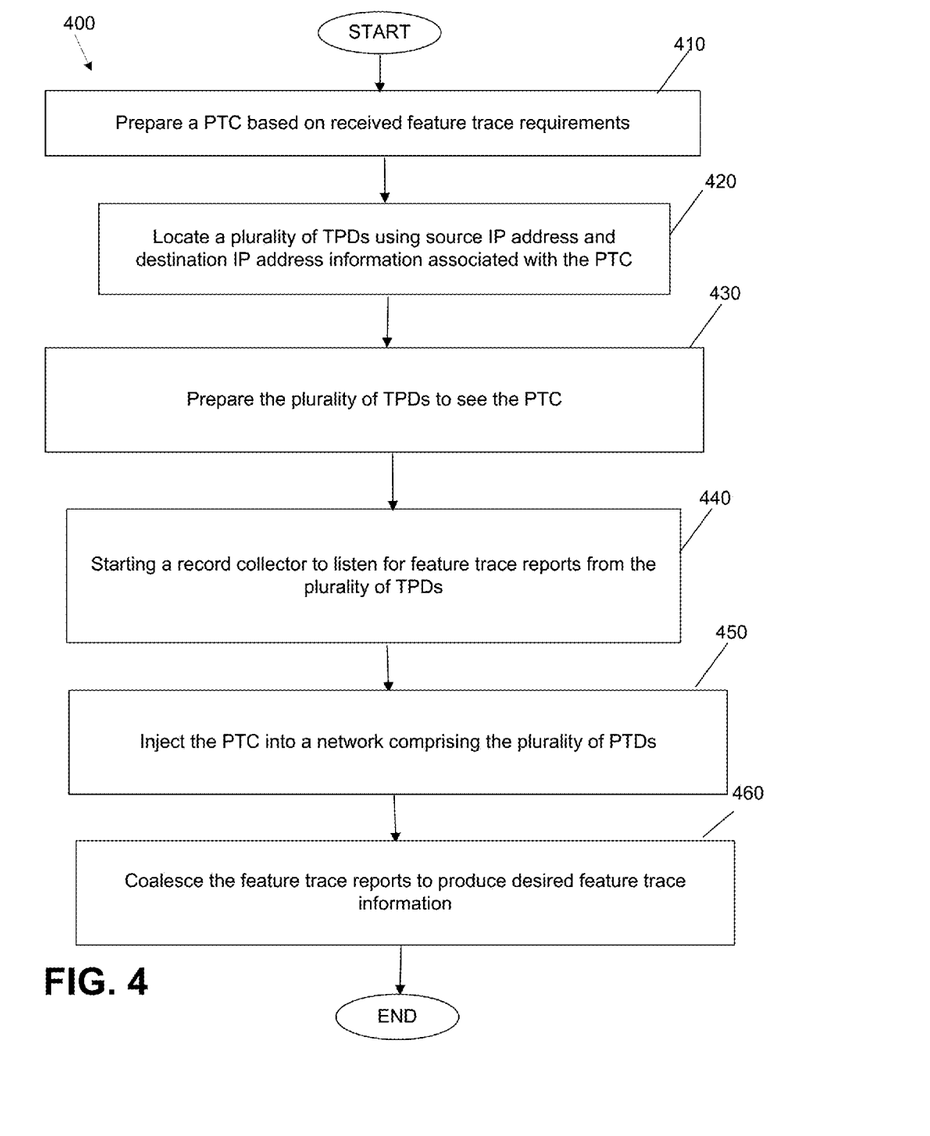
FIG. 4 is a flow chart illustrating embodiments of the present disclosure

A method 400 implemented by one or more network devices employed on network environment 100 will now be described with reference to FIG. 4. Method 400 may start at step 410 where a PTC may be prepared based on received feature trace requirements. Next, method 400 may proceed to step 420 where a plurality of TPDs may be located using source IP address and destination IP address information associated with the PTC.

Method 400 may then proceed to step 430, where the plurality of TPDs may be prepared to detect the PTC. The preparation of the network devices may comprise configuring the devices via NetFlow or Copy ACL, as appropriate. Next, method 400 may proceed to step 440, where a record collector may be started to listen for feature trace reports from the plurality of TPDs. In some embodiments, the feature trace reports are Flexible NetFlow v9 records comprising one or more collect fields. The feature trace reports may contain feature information unavailable from an L2 and L3 trace. Then, method 400 may proceed to step 450 where the PTC may be injected into a network comprising the plurality of PTDs. After injection, the PTC may be detected by each of the TPDs. Each TPD may create a feature trace report containing the desired feature information and subsequently transmit each feature trace report to the TOD.

Method 400 may then conclude at step 460 where the feature trace reports may be coalesced to produce desired feature trace information. Such coalescing may include locating a cache corresponding to the PTC, wherein the cache contains the one or more collect fields. In some embodiments, the processing of this information may further comprise determining whether the PTC was dropped by any of the plurality of TPDs while traversing the network. The gleaned feature trace information may be used for troubleshooting a problem on the network.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    discovering a network path for a first Packet to Trace ("PTC"), wherein discovering the network path comprises determining network devices on the network path;
    initiating a feature trace from a Trace Originating Device ("TOD"), wherein initiating the feature trace comprises preparing a second PTC based on requirements of particular feature search;
    preparing the network devices for the feature trace using the second PTC, wherein preparing the network devices comprises initiating a monitor on each of the network devices;
    receiving a plurality of feature trace information reports comprising a second PTC specific flow cache from the monitor on the network devices on the network path, wherein the second PTC specific flow cache comprises the feature trace of an access control entry in an access control list the second PTC is subjected to, wherein the access control list is provided on the network devices of the network path during the preparing of the network devices, wherein the monitor is configured to, upon detecting the second PTC, punt a copy of the access control list to a processor associated with a respective network device, create a flow cache specific to the feature trace, filter the flow caches to find the second PTC specific flow cache, and send the second PTC specific flow cache to the TOD; and determining that the second PTC was dropped by at least one network device of the network devices on the network path based on absence of the second PTC specific flow cache from the received plurality of feature trace information reports.

2. The method of claim 1, wherein discovering the network path further comprises using an L2 and L3 trace using the L2 and L3 parameters of the PTC.

3. The method of claim 1, wherein initiating the feature trace further comprises starting the feature trace at a network device which is the first network device from the TOD on the network path.

4. The method of claim 3, wherein the first network device from the TOD on the network path is an access device in an enterprise network through which a user first connects.

5. The method of claim 1, wherein the monitor is associated with each respective network device interface.

6. The method of claim 1, wherein the monitor is a Flexible NetFlow monitor capable of generating Flexible NetFlow version 9 records comprising the feature trace information.

7. The method of claim 6, wherein the Flexible NetFlow v9 records comprise matches of a PTC source IP address and a PTC destination IP address, and wherein the Flexible NetFlow v9 records comprise one or more collect fields for storing requesting feature trace information.

8. The method of claim 6 further comprising: creating the second PTC specific flow cache at each network device when the network device detects the second PTC.

9. The method of claim 8, further comprising employing an agent to:
gather all flow caches created for the monitor; and
filter the gathered flow caches to locate the second PTC specific flow cache.

10. The method of claim 9, further comprising installing a copied Access Control List ("ACL") for the second PTC on a network device interface.

11. The method of claim 10, further comprising capturing a PTC packet after it is punted to the processor.

12. The method of claim 11, further comprising extracting feature trace information from the captured PTC packet.

13. The method of claim 12, further comprising reporting the captured feature trace information to the TOD.

14. A method comprising:
preparing a first Packet to Trace ("PTC") based on received feature trace requirements;
locating a plurality of Trace Path Devices (TPDs) using source IP address and destination IP address information associated with the first PTC;
preparing the plurality of TPDs to detect a second PTC, wherein preparing the plurality of TPDs comprises initiating a monitor on each of the plurality of TPDs;
starting a record collector to listen for feature trace reports from the plurality of TPDs;
injecting the second PTC into a network comprising the plurality of PTDs;
receiving a plurality of feature trace information reports comprising a second PTC specific flow cache from the monitor on the network devices on the network path, wherein the second PTC specific flow cache comprises the feature trace of an access control entry in an access control list the second PTC is subjected to, wherein the access control list is provided on the network devices of the network path during the preparing of the network devices, wherein the monitor is configured to, upon detecting the second PTC, punt a copy of the access control list to a processor associated with a respective network device, create a flow cache specific to the feature trace, filter the flow caches to find the second PTC specific flow cache, and send the second PTC specific flow cache to the record collector; and
determine that the second PTC was dropped by at least one network device of the network devices on the network path based on an absence of the second PTC specific flow cache from the received plurality of feature trace information reports.

15. The method of claim 14, wherein the plurality of feature trace information reports are Flexible NetFlow v9 records comprising one or more collect fields.

16. The method of claim 14, further comprising determining that the second PTC was dropped by any of the plurality of TPDs while traversing the network.

17. The system of claim 15, wherein the second PTC specific flow cache contains the one or more collect fields.

18. The method of claim 17, wherein the second PTC specific feature trace reports contain information unavailable from an L2 and L3 trace.

19. The method of claim 18, further comprising using the second PTC specific feature trace information for troubleshooting a problem on the network.

20. A system comprising:
a memory;
a processor capable of executing instructions stored on the memory, the instructions comprising:
discovering a network path for a Packet to Trace ("PTC"), wherein discovering the network path comprises determining network devices in the network path;
initiating a feature trace from a Trace Originating Device ("TOD"), wherein initiating the feature trace comprises preparing a second PTC based on requirements of particular feature search;
preparing the network devices for the feature trace using the second PTC, wherein preparing comprises initiating a monitor the network devices, wherein the monitor is configured to detect the second PTC and maintain a collect field to store feature trace information corresponding to the particular feature search;
receiving a plurality of feature trace information reports comprising a second PTC specific flow cache from the monitor on the network devices on the network path, wherein the second PTC specific flow cache comprises a trace of access control entry in an access control list the second PTC is subjected to, wherein the access control list is provided on the network devices of the discovered path, and wherein the monitor is configured to, upon detecting the second PTC, punt a copy of the access control list to a processor associated with a respective network device, create a flow cache specific to the feature trace, filter the flow caches to find the second PTC specific flow cache, and send the second PTC specific flow cache to the TOD; and
determining that the second PTC was dropped by at least one network device of the network devices on the network path based on absence of the second PTC specific flow cache from the received plurality of feature trace information reports.

\* \* \* \* \*